July 4, 1967  L. D. RAMSAY  3,329,310
PLANTER INCLUDING A SEED ORIENTING ASSEMBLY
Filed Aug. 9, 1965  3 Sheets-Sheet 1
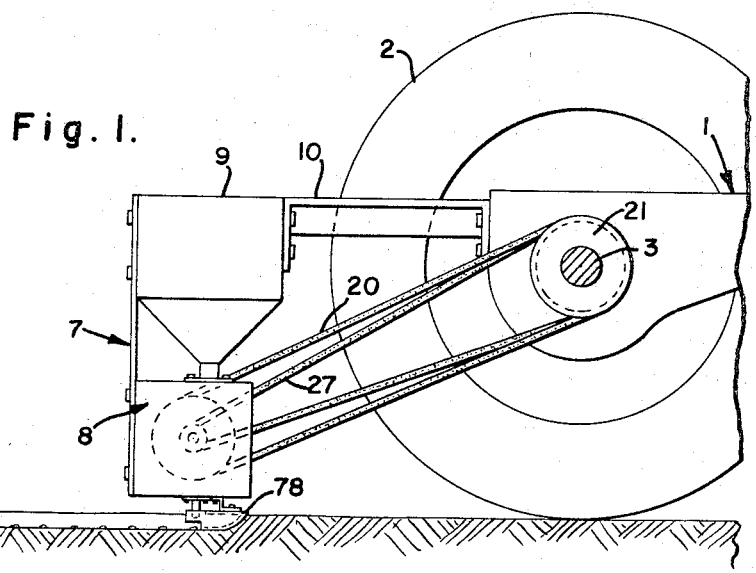
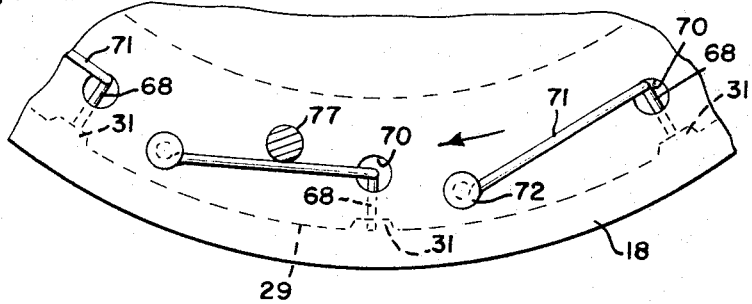
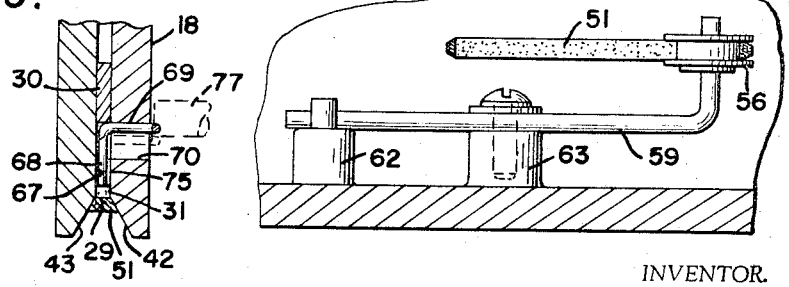
INVENTOR.
Leonard D. Ramsay
BY Gordon Wood

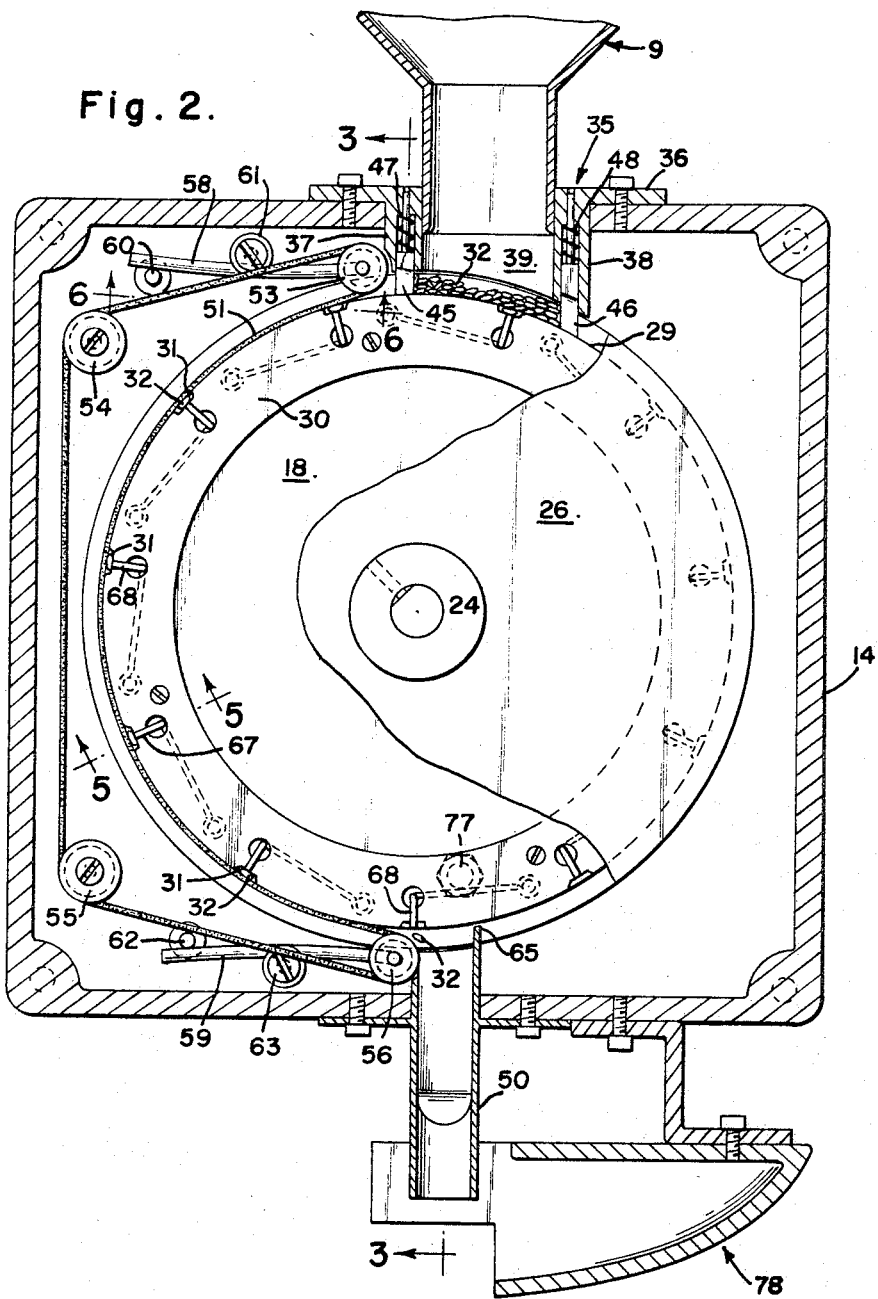

INVENTOR.
Leonard D. Ramsay

United States Patent Office 3,329,310
Patented July 4, 1967

3,329,310
PLANTER INCLUDING A SEED ORIENTING
ASSEMBLY
Leonard D. Ramsay, 17 Top Place,
Salinas, Calif. 93901
Filed Aug. 9, 1965, Ser. No. 478,245
11 Claims. (Cl. 221—235)

This invention relates to a planter for planting kernels or seeds such as lettuce seeds, cantalope seeds, broccoli seeds and the like. Although the invention will be described in connection with the operation of planting one seed at a time, such as a cantalope seed, it will be understood that it is also adapted for use in connection with planting a plurality of small seeds at one time such as is required in lettuce planting.

Heretofore it has been customary to employ planter plates provided with peripherally disposed cells for receiving therein the seed or kernels to be planted. Such planter plates are usually rotatably mounted for receiving the seeds or kernels from a hopper and transmitting them, upon rotation of the planter plate, to the discharge point from which they are discharged to a discharge tube. In such structures it is required to confine the seeds in the cells by means of stationary plates, guides or the like so that there is relative movement between such plates or guides and the planter plate. This sort of structure is apt to result in a grinding action on the seeds which destroys them for their purpose or, if steps are taken to avoid such grinding action, the cells may not always contain a seed or the correct number of seeds so that an undesirable irregular planting operation results.

The main object of the present invention is the provision of a planter for seeds, kernels and the like which constitutes an improvement over prior art planters in that destruction of seeds is minimized and at the same time uniformity of planting results by insuring that each cell contains a seed or the correct plurality of seeds.

Another object of the invention is the provision of an extremely efficient planter which is provided with means for insuring that all seeds fed to the planter plate are discharged therefrom at the correct point.

Other objects and advantages of the invention will be apparent from the following specification and from the drawings.

FIG. 1 is a reduced fragmentary side elevation of a wheeled vehicle showing the invention attached thereto.

FIG. 2 is a vertical sectional view of the invention with a portion of the seed orienting disk shown in elevation and with portions thereof broken away to show a portion of the planter plate in elevation.

FIG. 4 is an enlarged fragmentary side elevation of the lower portion of the planter plate showing the seed ejector pins and the means for actuating the same.

FIG. 5 is an enlarged fragmentary cross section at the peripheries of the planter plate and seed orienting disk showing a seed cell and its associated ejector pin.

FIG. 6 is a fragmentary top plan view of the lower mounting means for the lower belt pulley.

Figure 3:
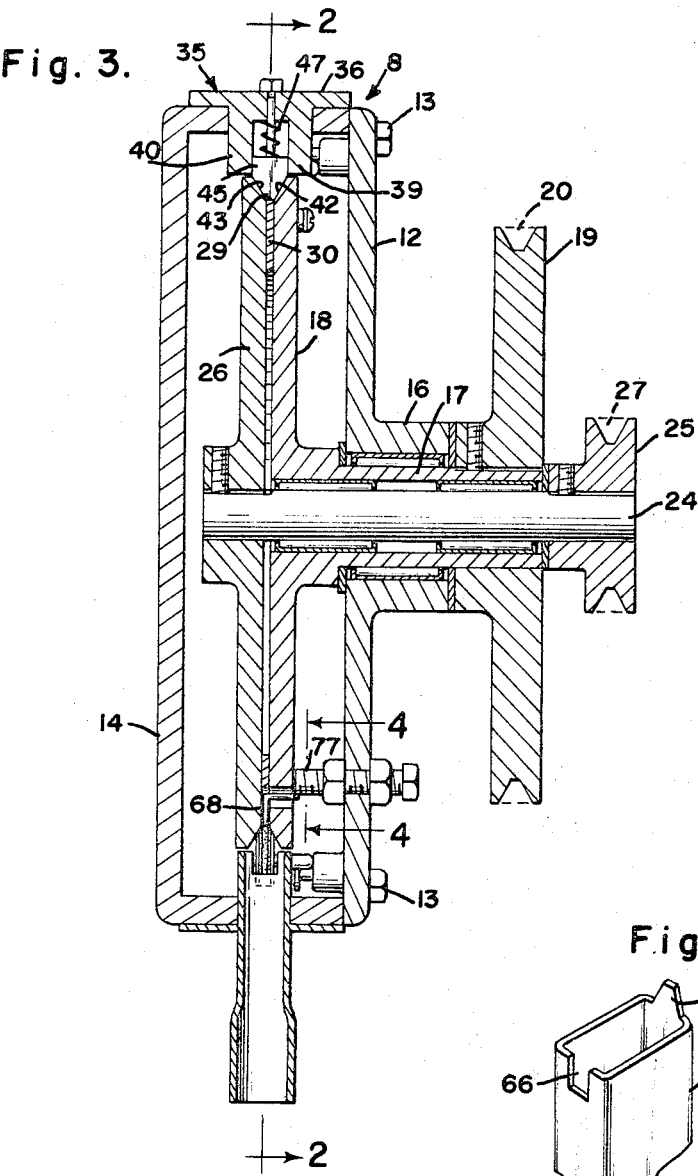
FIG. 3 is a vertical sectional view of the invention taken in a plane indicated by lines 3—3 of FIG. 2.

First with reference to FIG. 1, the invention is adapted to be secured to an agricultural vehicle generally designated 1 provided with at least one ground wheel 2 supported on an axle 3. The planter generally designated 7 includes a planter mechanism 8 to which is secured a seed hopper 9, with the hopper and planter assembly being secured to the vehicle 1 by means of a suitable bracket 10.

The planter mechanism comprises a mounting plate 12 to which is secured, by means of bolts 13, a cover plate 14. Mounting plate 12 is provided with a bearing boss 16 (FIG. 3) in which is rotatably supported a hollow shaft 17 which carries at its inner end a planter plate 18. The planter plate 18 is rotated by means of a pulley 19 fixedly secured to the outer end of hollow shaft 17 and a drive belt 20 connecting pulley 19 with a double pulley 21 carried by wheel axle 3.

Rotatably supported within hollow shaft 17 is another shaft 24 which is provided with a smaller pulley 25 at its outer end and which is fixedly secured at its inner end to a plate 26 which is somewhat similar to planting plate 18 and which is disposed in face to face engagement with said planter plate. Pulley 25 is driven through belt 27 from the double pulley 21 as best seen in FIG. 1 so that the peripheral speed of plate 26 is substantially about three times as fast as the peripheral speed of planter plate 18.

As best seen in FIG. 2, planter plate 18 includes an integral annular disk-like projection 30 within the outer cylindrical wall 29 of which is formed circumferentially spaced radially outwardly opening seed receiving cells 31. It will be understood that for different agricultural products a different planter plate 18 may be employed so that each cell 31 is of the appropriate size to hold the seed or kernel or the plurality of seeds or kernels which are desired for the particular product. Only one seed 32 is indicated in each seed cell 31 of FIG. 2. The width and length of cells 31 should be only slightly more than the lateral and longitudinal extent of the seed to be received therein.

Seeds are fed from the hopper 9 by gravity into a seed retainer generally designated 35 which comprises a top wall 36 and a downwardly extending generally rectangular body portion having opposite end walls 37, 38 and a pair of opposed sidewalls 39, 40. The lower ends of said end walls and sidewalls are formed so as to conform to the periphery of the rotating plates 18 and 26 as best seen in FIG. 2. The seeds from hopper 9 are thus constrained to move onto the peripheries of the planting plate 18 and the orienting plate 26. As best seen in FIG. 3, the radially outwardly directed cylindrical surface of the annular projection 30 on planter plate 18 forms the bottom of a radially outwardly opening trough and the peripheries of planting plate 18 and orienting plate 26 are provided with opposed faces 42, 43 respectively which slant outwardly in opposite directions from the outer cylindrical surface of the annular projection 30 to form a peripherally extending groove of substantially trapezoidal cross section (see FIGS. 3, 5).

In order to prevent the seeds 32 from escaping from the portion of the seed trough that is between end walls 37, 38 of the seed retainer 35 gates 45, 46 are provided in end walls 37, 38 respectively. These gates 45, 46 are formed complementarily to the seed trough and are spring urged radially inwardly of the seed trough by means of compression springs 47, 48.

By the above described structure it will be apparent that seeds 32 can move outwardly of the seed retainer trough only by being positioned within the cells 31. Since the seeds 32 in the retainer 35 may be disposed with their longitudinal axes extending axially of the shaft 24 (FIG. 2) it is important that the seeds be oriented with their long dimension extending generally tangent to the plates 18, 26 and such orientation is accomplished by the relative movement of plates 18 and 26. It will be understood that any relative movement between said plates will tend to cause the seeds 32 to be aligned tangentially of the plates and the present invention contemplates various relative speeds as well as the provision of means for rotating plates 18, 26 in opposite directions. However, it has been found in the case of medium size seeds such as cantalope seeds proper orientation of such seeds may be accomplished by causing orienting plate 26 to rotate at a peripheral speed of about three times the speed of planter plate 18.

As best seen in FIG. 2, the planter is adapted to discharge seeds 32 at the lower end of the housing through a discharge tube 50 which is secured to the lower side of cover plate 14. It is therefore necessary to retain the seeds 32 in the seed cells 31 during substantially one half a rotation of planter plate 18. This is accomplished by means of a relatively small belt 51 preferably formed of leather to a generally trapezoidal cross section in order to be received within the complementarily formed trough having sidewalls 42, 43 and with the inner side of the belt 51 engaging the radially outwardly directed face 29 of the annular projection 30. The belt 51 travels with the planter plate 28 since a greater amount of area of the belt 51 is in engagement with the planter plate 18 and its integral projection 30 than is in engagement with the faster moving orienting plate 26. Even if there is some slippage between the belt 51 and the plates it engages, such slippage does not cause damage to the seed because the belt is made of soft leather or like material adapted to yield readily to accommodate a seed between the plates and the belt if a seed ever becomes so positioned.

The belt 51 is in the form of a closed loop and is reeved around an upper pulley 53, then around a pair of side pulleys 54, 55 and then around a lower pulley 56. The remainder of the belt 51 is of course in engagement with the rotating plates 18, 26.

Upper and lower belt pulleys 53, 56 are preferably spring urged radially inwardly of the plates 18, 26 and for this purpose are mounted on elongated spring elements 58, 59 respectively. The opposite end of spring element 58 from the pulley 53 is supported on a post 60 integral with the mounting plate 12 and spring element 58 is biased toward the rotating plates by means of a second post 61. The lower spring element 59 is similarly supported by posts 62, 63.

Figure 7:
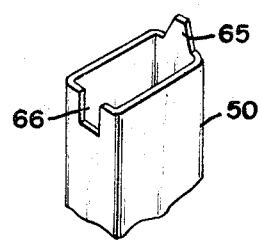
FIG. 7 is a perspective of the inner end of the discharge tube.

The discharge tube 50 is formed at its upper end with an upwardly extending projection 65 (FIG. 7) which is formed complementarily to the trough between plates 18, 26 so as to prevent discharge of seeds except downwardly through the discharge tube 50. The opposite side of the tube 50 is formed at its upper end with a rectangular notch 66 through which the seeds 32 may be discharged into the discharge tube 50 adjacent pulley 56 at the point at which the belt 51 leaves the slot and thus does not retain the seed within its associated cell.

Although the herein described device has been found to operate highly satisfactorily when the seeds are permitted to fall out of the cells 31 by gravity it is sometimes desirable to provide some positive ejection means for insuring that each seed cell is emptied into the discharge tube 50. To this end each cell 31 may be provided with an ejector pin 68 which is slidably received within a radially extending slot 67 formed in the annular projection 30 that is integral with the planter plate 18. Each ejector pin 68 is formed of relatively light wire and is bent to provide an axially extending portion 69 (FIG. 5) which is received within a relatively large bore 70 through the planter plate 18. The ejector pin 68 is again bent to provide a generally tangentially extending longer portion 71 which is fixedly secured at its end by a rivet 72 or the like to the outer side of planter plate 18.

The working end of the ejector pin 68, being slidably received within the radially extending slot 67, is readily moved through its associated seed cell 31 so as to discharge any seeds in the cell outwardly and into the discharge tube 50 as best seen in FIG. 2.

The actuation of ejector pin 68 is accomplished by means of a bolt 77 which, as best seen in FIG. 3, is fixedly secured to the mounting plate 12 and positioned so as to just clear the rotating planter plate 18 but to engage the portions 71 of ejector pins 68 as the planter plate 18 moves to the ejector station. Thus, as best seen in FIG. 4, the stationary bolt 77 causes the longer portion 71 of the ejector pin to deflect downwardly so that the operating end of said pin ejects any seeds positioned within the associated cell 31.

As best seen in FIG. 2 a shoe generally designated 78 may be secured to the lower side of the cover plate 14 for the purpose of forming a furrow into which the seeds are deposited.

It will be apparent that the above described planter is extremely efficient in that receipt of a seed or a predetermined plurality of seeds in each seed cell is substantially guaranteed by the confinement of a charge of seeds within the seed retainer 35 and by the relative movement between planter plate 18 and the seed orienting plate 26. In this connection it will be noted that the frustoconical shape of the trough formed at the periphery of the plates together with the wiping action resulting from the relatively rotating plate 26 insures that the elongated seeds are received in the seed cells 31 with their axes extending generally tangent to the circular plates. Furthermore, the provision of the spring urged gates 45, 46, and especially gate 45, prevents escape of the seeds from the seed retainer 35 except within the seed cells 31. The flexible leather belt 51 effectively retains the seeds within the seed cells 31 and at the same time prevents the grinding up of any seeds that might become positioned between the plates and the belt.

By forming the gates 45, 46 of a plastic having a relatively low coefficient of friction any wear of such gates tends to hold the shape of the same in conformity with the trough into which they fit.

Although it is possible to employ a fixed belt 51 fitted within the seed trough the structure shown is preferable in that wear on the belt is reduced as is any grinding action that might otherwise occur on seeds that may become positioned between the plates and the belt.

The provision of the cover plate 14 permits ready removal of the same together with the seed retainer 35, the hopper 9 and the discharge tube 50 so as to permit inspection of the planter plate 18 and its associated seed orienting plate 26. The cover plate 14 is preferably made of a transparent plastic so that the operation of the device may be visually checked from time to time by the operator of the vehicle.

The very specific description given above of the preferred form of the invention is not to be taken as restrictive of the same as it will be apparent that various modifications in design may be resorted to by those skilled in the art without departing from the scope of the following claims.

What is claimed is:
1. A planter comprising:
   a planter plate provided with a plurality of seed cells around the periphery thereof,
   feed means for feeding seeds to said periphery and to said cells,
   drive means for rotating said planter plate relative to said feed means for carrying the seeds in said cells to a discharge point,
   seed orienting means including a seed engaging surface adjacent said periphery,
   means for moving said surface at a speed different from the speed of said periphery for orienting said seeds and for disposing the same in said cells generally tangentially of said periphery.

2. A planter according to claim 1 wherein said planter plate is disposed vertically and said feed means feeds said seeds by gravity to the upper peripheral surface of said plate.

3. A planter according to claim 2 wherein said plate is supported for rotation about a horizontal axis and is formed at its periphery to provide a cylindrical surface concentric with said axis and a frustoconical wall slantingly disposed relative to said cylindrical surface, said surface of said seed orienting means being in opposed relation to said wall and slanting in the opposite direction whereby said cylindrical surface, said wall and said seed orienting surface contribute to provide a radially outwardly diverging peripherally extending trough of trapezoidal cross section.

4. In a planter for elongated seeds and the like:
   a planter plate formed at its periphery with a cylindrical surface provided with a plurality of peripherally spaced radially outwardly opening seed receiving cells,
   said plate being formed with a frustoconical surface along one side edge of said cylindrical surface and extending generally radially outwardly of said cylindrical surface and slantingly disposed relative thereto,
   a seed orienting disk coaxial with said planter plate and formed at its periphery with a frustoconical surface in opposed relation to the frustoconical surface of said planter plate and slanting in the opposite direction whereby the peripheries of said plate and disk form a radially outwardly opening trough of generally trapezoidal cross sectional shape,
   means for driving said plates at different speeds whereby said opposed surfaces urge seeds therebetween to positions extending generally tangentially of said plates before they are received in said cells.

5. A planter according to claim 4 wherein an ejection pin is provided in said planter plate at each of said cells for positively ejecting the seeds in said cells at a predetermined point in the rotation of said planter plate.

6. A planter comprising:
   a planter plate mounted for rotation about a horizontal axis for carrying seeds to a discharge point,
   a seed orienting disk mounted alongside said plate for rotation about said axis,
   said plate and disk being formed at their peripheries to provide a peripherally extending outwardly opening trough,
   the bottom and one adjacent sidewall of said trough being integral with said plate and the other sidewall thereof being formed on said disk,
   means for rotating said plate and disk at different peripheral speeds,
   means for feeding seeds to the upper peripheral surfaces of said plate and disk and into said trough,
   said bottom of said trough being formed with a plurality of circumferentially spaced seed receiving cells for receiving at least one seed in each cell from said trough.

7. A planter according to claim 6 wherein a pair of circumferentially spaced gates are provided at opposite sides of said feeding means for preventing movement of seeds out of said trough except within said cells.

8. A planter according to claim 7 wherein seed holding means is provided outwardly of said gates for retaining said seeds in said cells until said seeds reach said discharge point.

9. A planter according to claim 8 wherein said seed holding means is a flexible belt in engagement with and driven by said planter plate.

10. A planter comprising:
    a pair of plates supported in face to face relationship for rotation about a horizontal axis,
    said plates being formed at their peripheries to provide a radially outwardly opening peripherally extending seed receiving groove,
    a hopper above said plates for conducting seeds therefrom by gravity to said trough,
    means on one of said plates forming circumferentially spaced seed receiving cells radially inwardly of said trough,
    an elongated flexible element in engagement with said trough at a point adjacent said trough at said hopper and extending to a seed discharge point spaced from said hopper,
    means supporting said element for movement with said cells for retaining said seeds in the latter between said hopper and said discharge point and means is provided for driving one of said plates at a faster peripheral speed than the other plate for orienting the seeds in said trough to lie with their longitudinal axes generally tangent to said plates.

11. A planter according to claim 10 wherein said discharge point is at the lower sides of said plates and said flexible element is a belt of yieldable material received within said trough throughout an arc between said hopper and said discharge point.

References Cited

UNITED STATES PATENTS

| | | | |
|---|---|---|---|
| 608,748 | 8/1898 | Bedoret | 222—368 X |
| 1,011,926 | 12/1911 | Dennis | 222—351 X |
| 2,358,208 | 9/1944 | Braden | 222—225 X |
| 2,399,472 | 4/1946 | De la Roza | 222—351 X |
| 2,535,222 | 12/1950 | Milton | 222—368 X |
| 2,605,023 | 7/1952 | Ward | 222—368 X |
| 2,871,805 | 2/1959 | Behnen | 222—368 X |
| 3,068,989 | 12/1962 | Packman et al. | 198—33 |
| 3,152,733 | 10/1964 | Ross | 222—351 X |

WALTER SOBIN, *Primary Examiner.*